(12) United States Patent
Sauser et al.

(10) Patent No.: US 12,544,790 B2
(45) Date of Patent: *Feb. 10, 2026

(54) VIBRATORY SCREEN DRIVE BELT TENSIONER SYSTEMS, METHODS, AND APPARATUS

(71) Applicant: Superior Industries, Inc., Morris, MN (US)

(72) Inventors: Ed Sauser, Morris, MN (US); Paul Flickinger, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,568

(22) Filed: Feb. 26, 2024

(65) Prior Publication Data

US 2024/0198384 A1 Jun. 20, 2024

Related U.S. Application Data

(63) Continuation of application No. 18/146,270, filed on Dec. 23, 2022, now Pat. No. 11,911,794.

(60) Provisional application No. 63/265,987, filed on Dec. 23, 2021.

(51) Int. Cl.
| | |
|---|---|
| *B07B 1/42* | (2006.01) |
| *B07B 1/28* | (2006.01) |
| *B07B 1/36* | (2006.01) |

(52) U.S. Cl.
CPC ............... *B07B 1/42* (2013.01); *B07B 1/286* (2013.01); *B07B 1/36* (2013.01)

(58) Field of Classification Search
CPC .. B07B 1/286; B07B 1/36; B07B 1/42; F16H 7/10; F16H 7/12; B65G 45/10
USPC ......................................... 209/325; 474/102
See application file for complete search history.

(56) References Cited

U.S. PATENT DOCUMENTS

| | | | | |
|---|---|---|---|---|
| 4,340,469 | A | | 7/1982 | Archer |
| 4,472,162 | A | * | 9/1984 | Hitchcock ............. F16H 7/1218 |
| | | | | 474/135 |
| 5,064,053 | A | * | 11/1991 | Baker ................... B65G 27/32 |
| | | | | 74/61 |
| 10,118,198 | B2 | * | 11/2018 | Erickson .................. B07B 1/42 |
| 11,911,794 | B2 | * | 2/2024 | Sauser ...................... F16H 7/10 |
| 2017/0259302 | A1 | * | 9/2017 | Erickson .................. B07B 1/55 |

FOREIGN PATENT DOCUMENTS

| | | | | |
|---|---|---|---|---|
| EP | 0234732 | A1 * | 9/1987 | ......... F16H 7/1281 |
| WO | WO 01/89764 | | 11/2001 | |

* cited by examiner

*Primary Examiner* — Terrell H Matthews
(74) *Attorney, Agent, or Firm* — Todd R. Fronek; Larkin Hoffman Daly & Lindgren, Ltd.

(57) ABSTRACT

Tensioner systems, methods and apparatus are described for tensioning drive belts of vibratory screens.

19 Claims, 9 Drawing Sheets

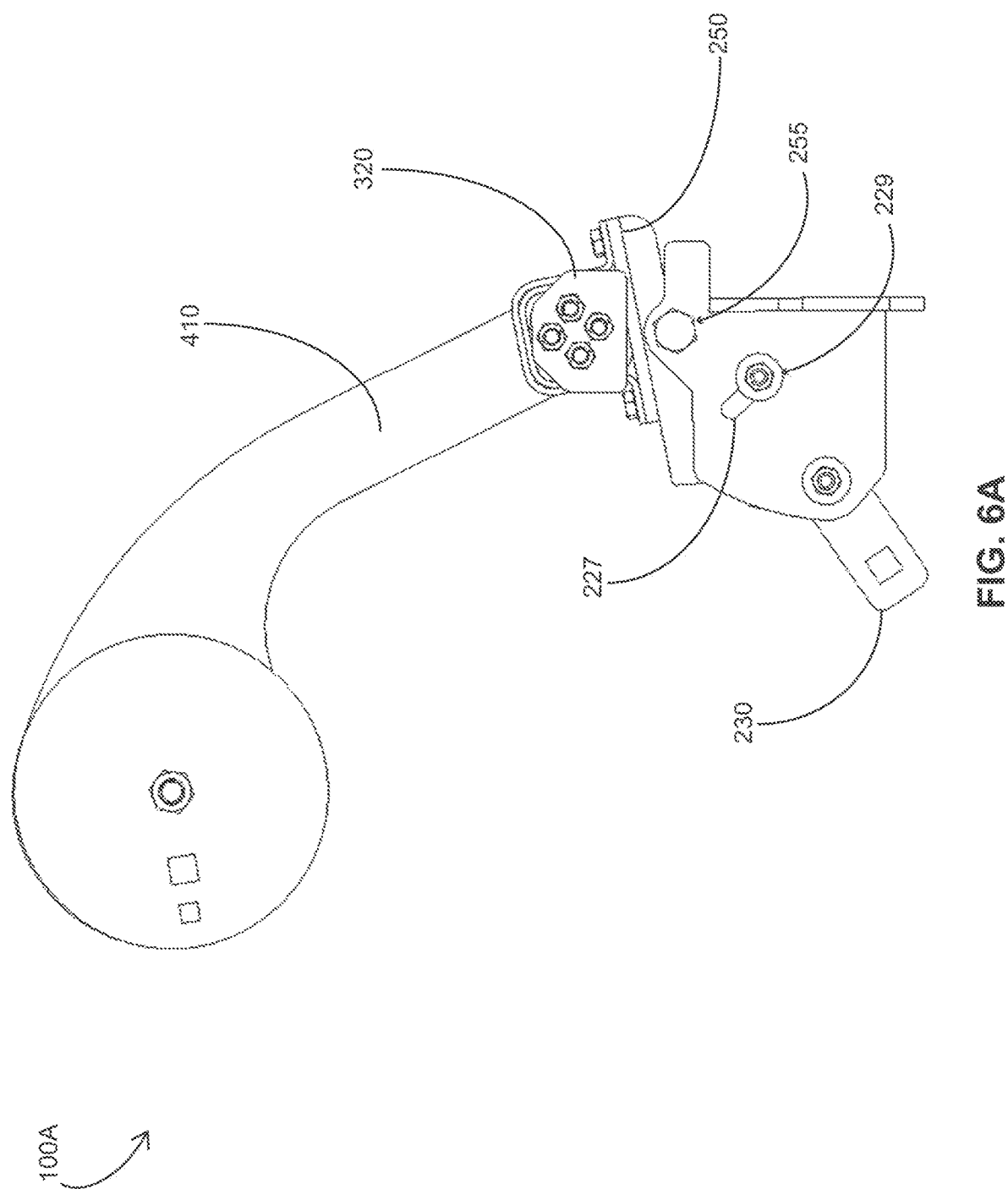

VIBRATORY SCREEN DRIVE BELT TENSIONER SYSTEMS, METHODS, AND APPARATUS

BACKGROUND

Vibratory screens are used to classify material such as aggregate material (e.g., sand, stone, gravel, etc.) by one or more characteristics (e.g., size, etc.).

BRIEF DESCRIPTION OF THE DRAWINGS

FIG. 6A is a side elevation view of the tensioner assembly of FIG. 2 in a first position.

DESCRIPTION

Figure 1A:
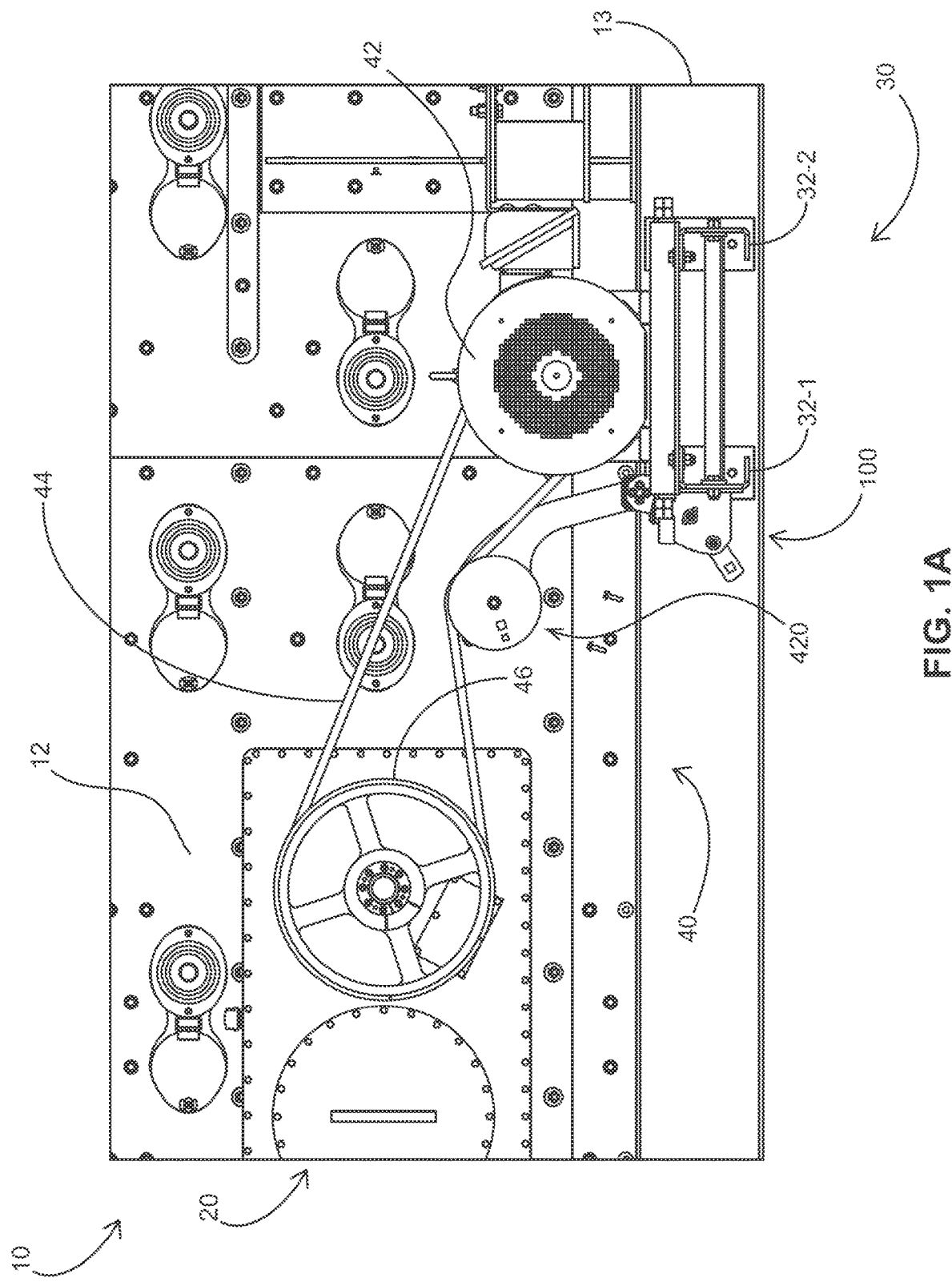
FIG. 1A is a partial side elevation view of an embodiment of a vibratory screen.
Figure 1B:
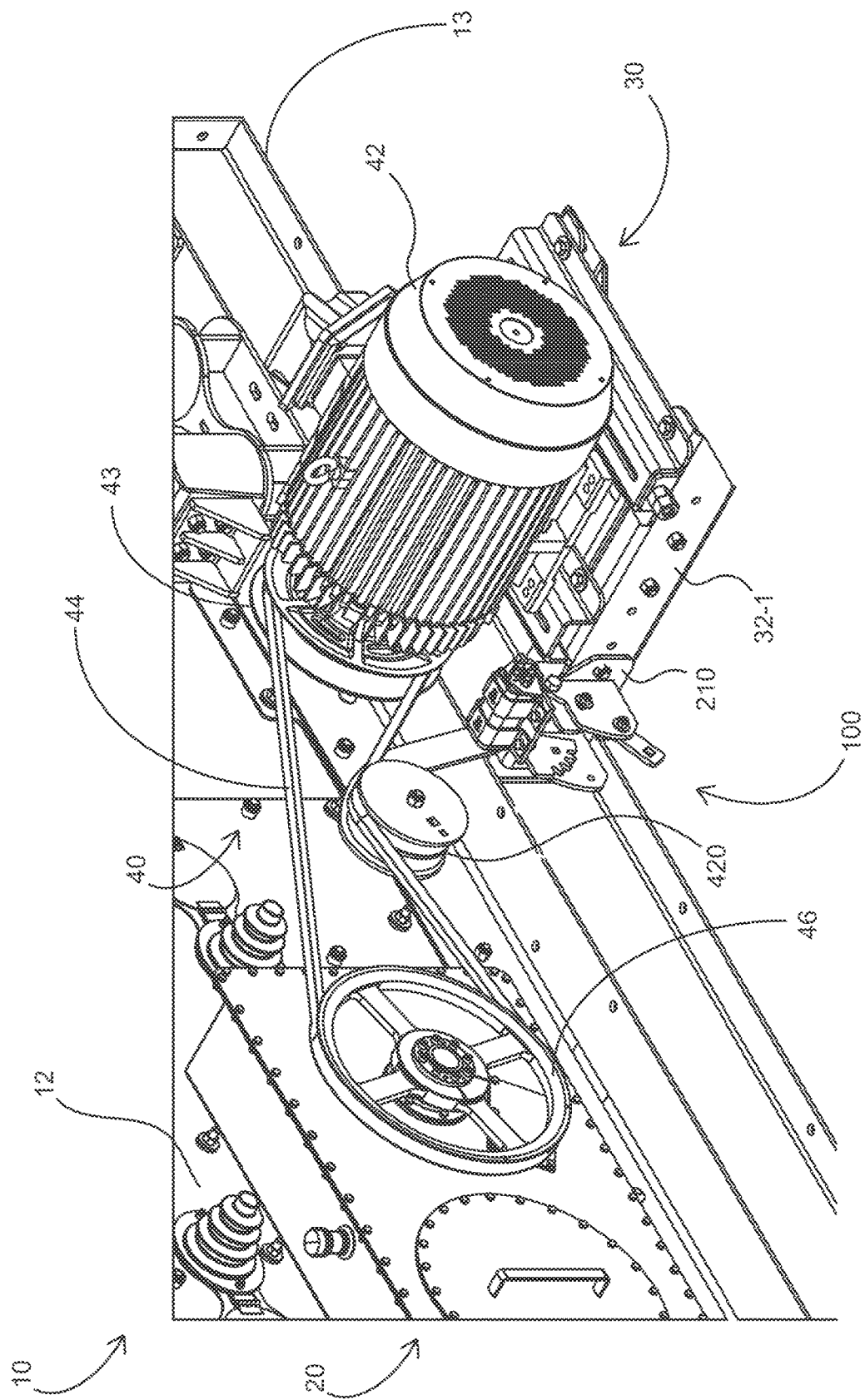
FIG. 1B is a partial perspective view of the vibratory screen of FIG. 1A.
Figure 2:
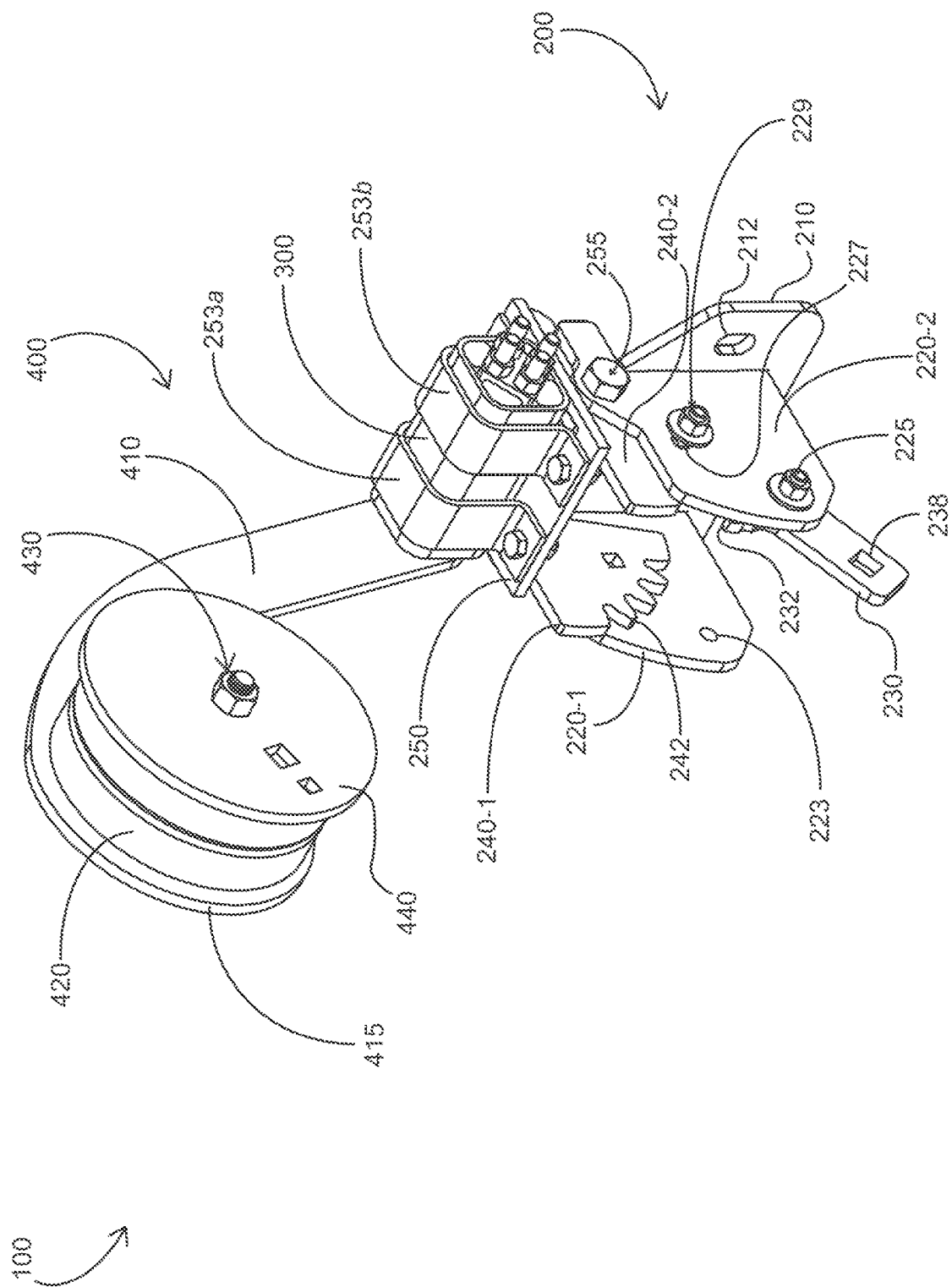
FIG. 2 is a perspective view of an embodiment of a tensioner assembly.
Figure 4:
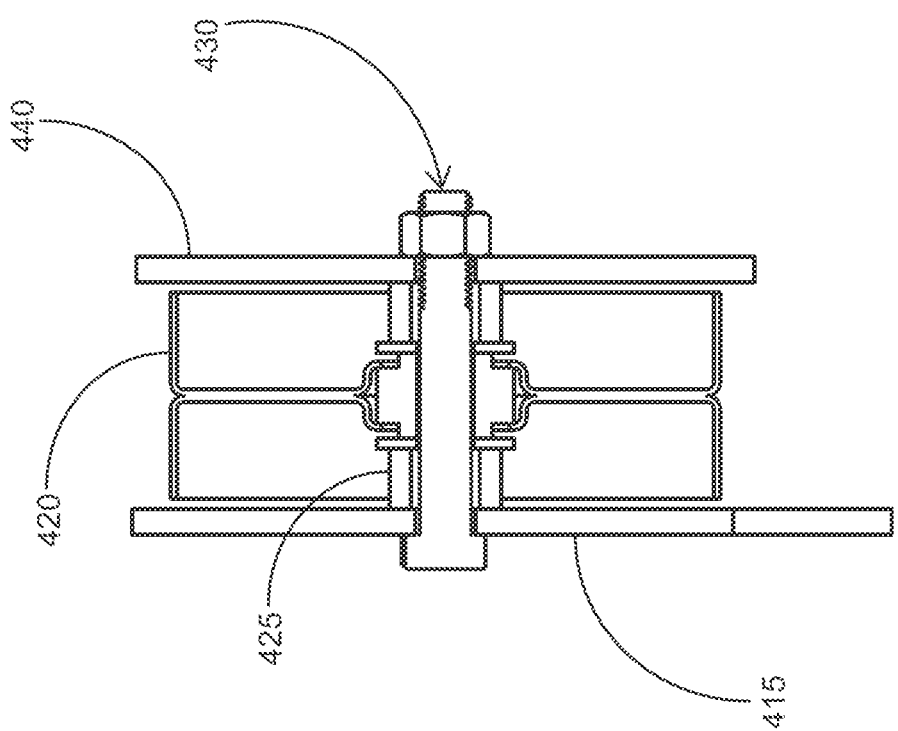
FIG. 4 is a sectional view along section A-A of FIG. 3.
Figure 3:
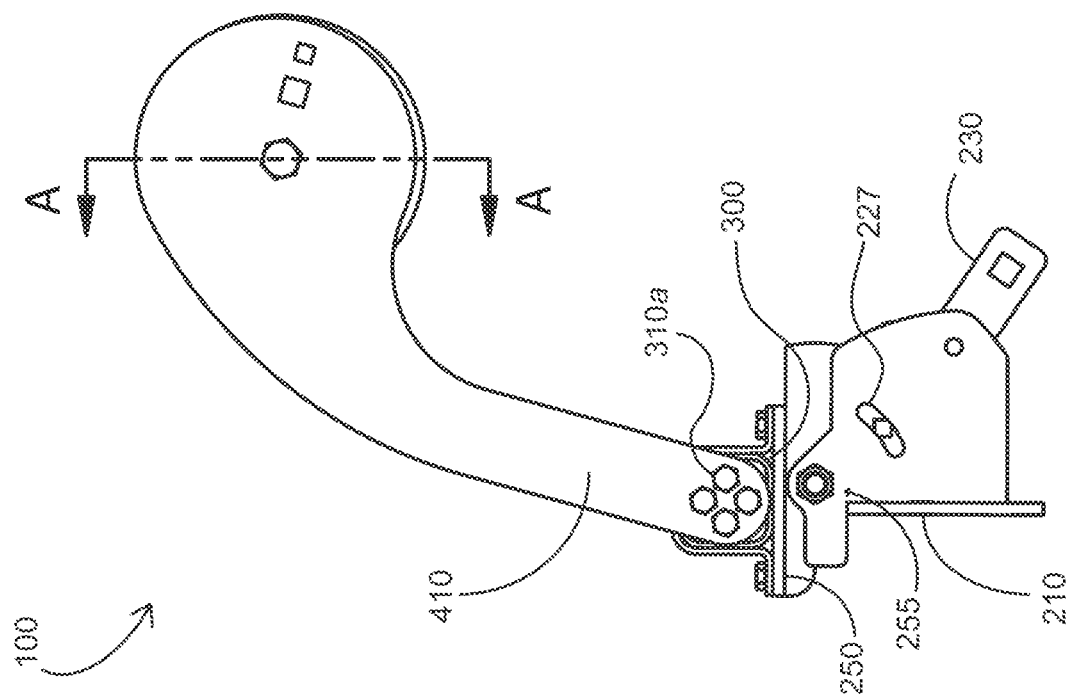
FIG. 3 is a side elevation view of the tensioner assembly of FIG. 2.
Figure 5:
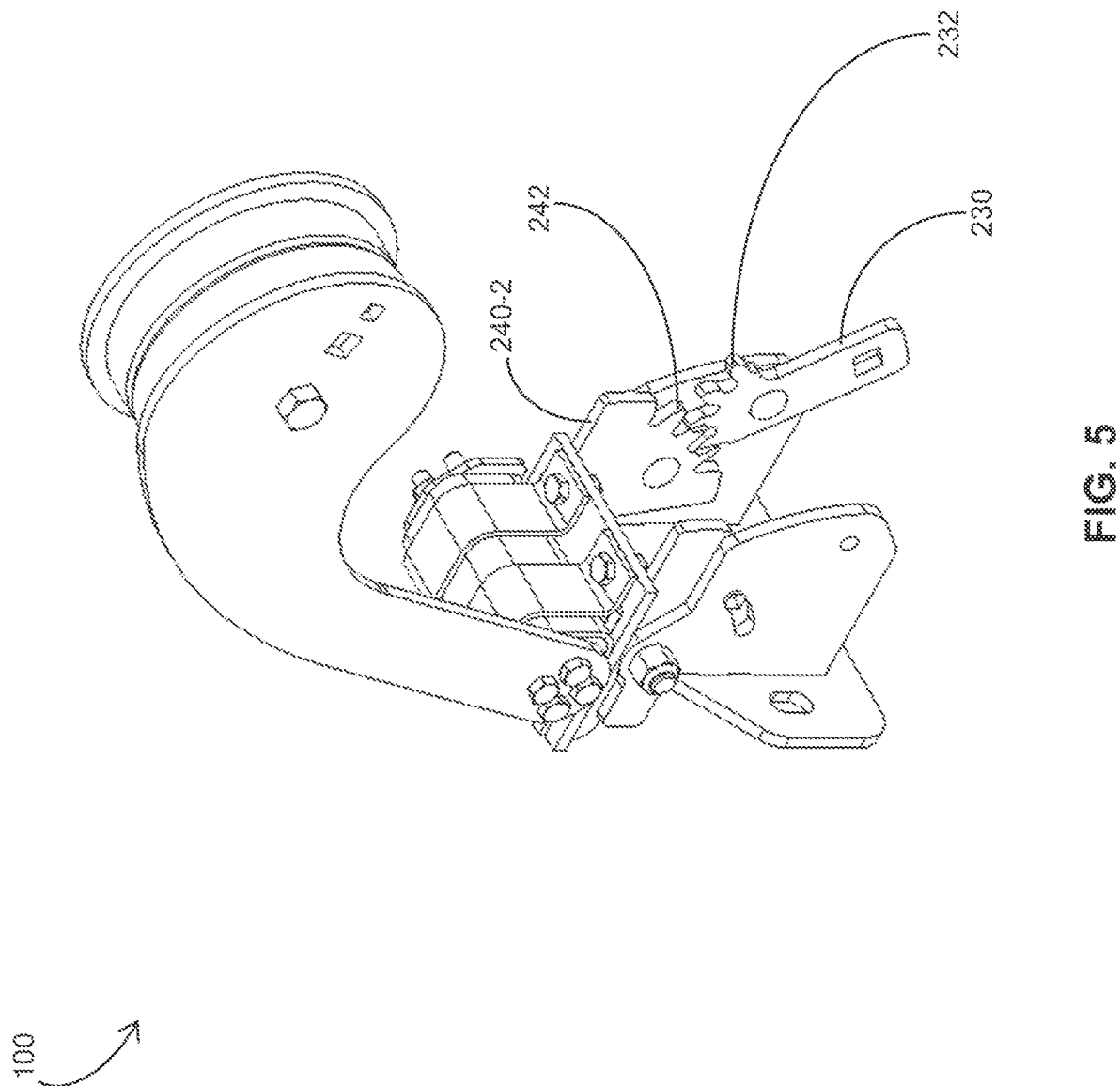
FIG. 5 is another perspective view of the tensioner assembly of FIG. 2.

Referring to the drawings, wherein like reference numerals designate identical or corresponding parts throughout the several views, FIGS. 1A and 1B illustrate a vibratory screen 10 (e.g., horizontal screen, etc.) incorporating a tensioning assembly 100. The vibratory screen optionally comprises a pair of sidewalls 12 operably supporting one or more classifying decks (not shown) and an eccentric shaft coupled to the sidewalls 12. Each sidewall 12 is optionally supported on a support rail 13. The vibratory screen 10 optionally comprises a vibration system 20 (e.g., comprising one or more rotatable imbalanced weights) configured to vibrate the vibratory screen 10 when driven (e.g., with an eccentric shaft coupled to the sidewalls 12). The vibratory screen 10 optionally comprises a drive system 40 configured to drive the vibration system 20. The drive system 40 optionally comprises a motor 42 (e.g., electric motor, diesel motor, etc.) configured to drive a pulley 43 (e.g., drive pulley). The drive system 40 optionally comprises a pulley 46 operably coupled to vibration system 20 and configured to drive the vibration system 20. The motor 42 is optionally supported on a motor mount 30. The motor mount 30 optionally comprises one or more supports 32 (e.g., supports 32-1, 32-2) such as support beams. The supports 32 are optionally supported by (e.g., mounted to) a support rail 13 and/or a sidewall 12. A drive belt (e.g., v-belt which is made of rubber or other suitable material). The drive belt 44 is optionally tensioned by the tensioning assembly 100 as described herein.

Referring to FIGS. 2-5, the tensioning assembly 100 is described in more detail. The tensioning assembly 100 optionally comprises a support bracket 200, a spring 300 (e.g., torsion spring), and a belt engagement assembly 400.

Support bracket 200 optionally comprises a mounting plate 210 optionally having one or more openings 212 for mounting the support bracket 200 to the vibratory screen 10 (e.g. to the support 32-1 or other structural member of the motor mount 30, etc.). The support bracket 200 optionally comprises one or more side plates 220 (e.g., side plates 220-1, 220-2). One or more side plate 220 optionally comprise an opening 223 for pivotally coupling an adjustment arm 230 to the side plate 220 (e.g., by a pivotal coupling 225). The adjustment arm 230 optionally comprises an opening 238 or other feature for coupling a tool (e.g., breaker bar, etc.) to the adjustment arm 230 in order to increase the torque applied to the adjustment arm 230 by an operator. One or more adjustment plates 240 (e.g., adjustment plates 240-1, 240-1) are optionally pivotally coupled to one or more side plates 220, e.g., by a pivotal coupling 255.

The adjustment arm 230 optionally comprises a plurality of gear teeth 232. The gear teeth 232 are optionally concentrically arranged about the opening 223. The gear teeth 232 are optionally configured (e.g., sized, spaced, etc.) to engage one or more gear teeth 242 of adjustment plate 240 such that pivotal movement of the side plate 220 in a first direction causes pivotal movement of the adjustment plate 240, e.g., about pivotal coupling 255. Gear teeth 242 are optionally concentrically arranged about the pivotal coupling 255. One or more adjustment arms 230 optionally support and/or are coupled to a platform 250.

Spring 300 optionally comprises a torsion spring such as a torsion spring model available from Rosta in Hunzenschwil, Switzerland. The spring 300 is optionally supported on platform 250. The spring 300 is optionally secured to platform 250, e.g., by one or more braces 253 (e.g., braces 253a, 253b).

Belt engagement assembly 400 optionally comprises an arm 410 which is optionally coupled to spring 300 (e.g., removably coupled by one or more fasteners 310) such that pivotal movement of arm 410 relative to platform 250 is resiliently resisted by the spring 300. The arm 410 optionally comprises and/or supports a plate 415. The plate 415 optionally rollingly supports a pulley 420. The pulley 420 is optionally rollingly supported on a pivotal support 425 (e.g., bearing, bushing, spacer, etc.). The pivotal support 425 is optionally coupled to plate 415 and/or an additional plate 440 by a shaft support 430. In operation, the pulley 420 optionally engages (e.g., applies a force to, rollingly engages, etc.) the belt 44.

Figure 6B:
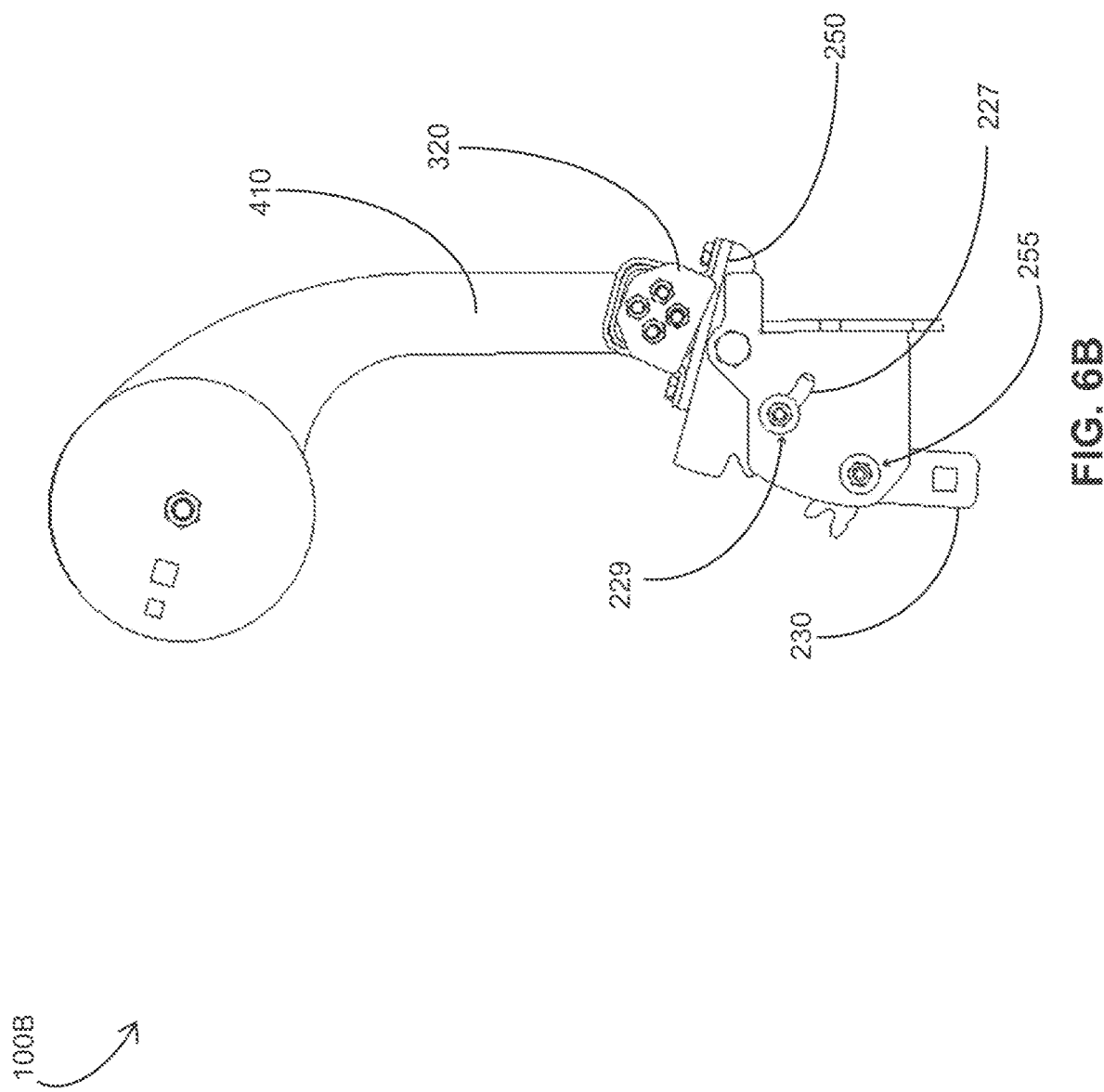
FIG. 6B is a side elevation view of the tensioner assembly of FIG. 2 in a second position.
Figure 6C:
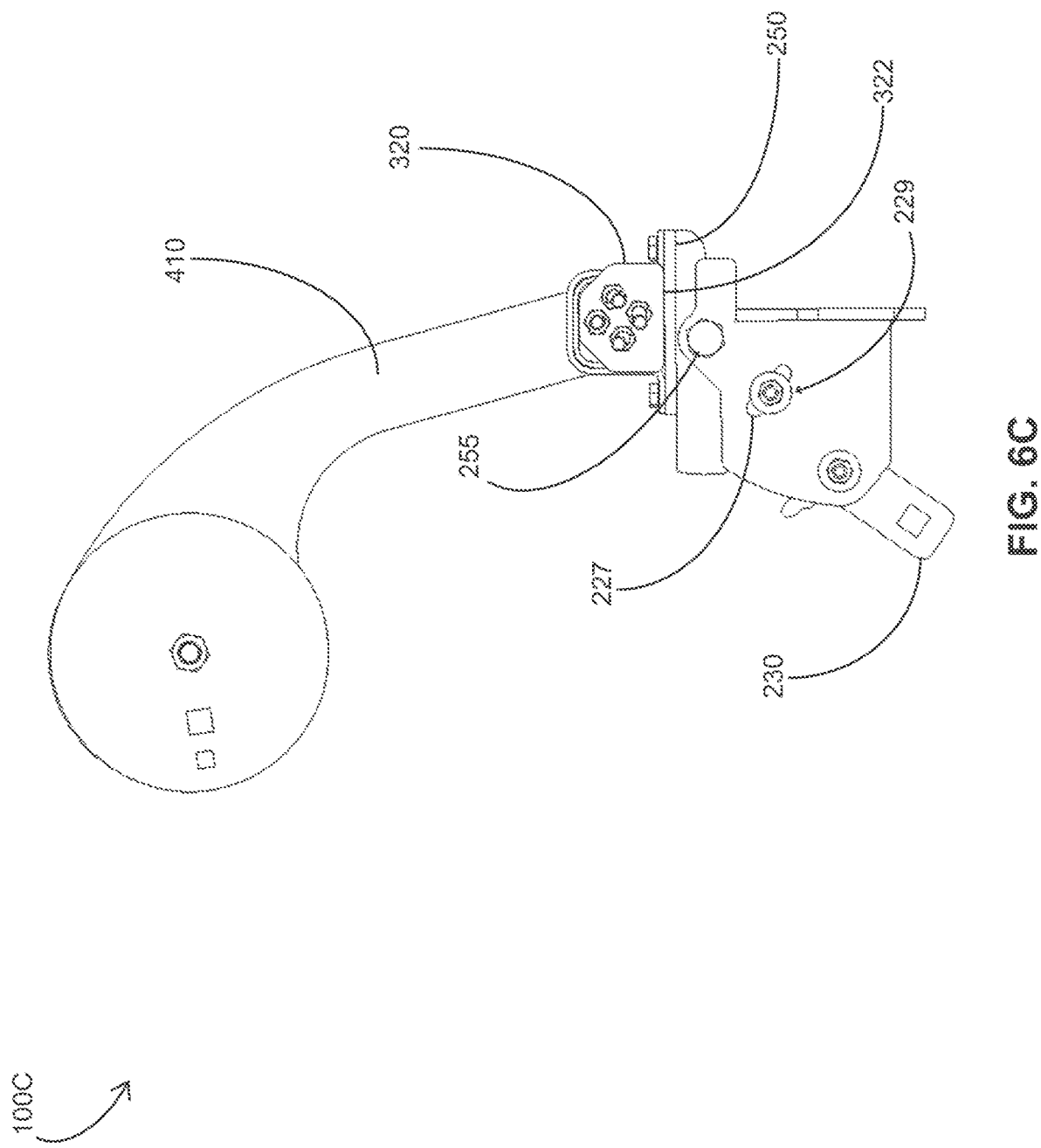
FIG. 6C is a side elevation view of the tensioner assembly of FIG. 2 in a third position.

Referring to FIGS. 6A, 6B, and 6C, the tensioning assembly 100 is illustrated a low position, a high position, and a desired position, respectively. The tensioning assembly 100 is optionally securable in a position by tightening a fastener assembly 229 to secure adjustment plate 240 to side plate 220. In some embodiments, the fastener assembly 229 is extended (e.g., prior to positional adjustment) through openings in the plates 220, 240 including a slot 227 in the plate 220. The fastener assembly 229 is optionally movable within the slot 227 which is optionally circumferentially arranged around pivotal coupling 225. The radial extent of slot 227 optionally limits positioning high and low positions of the tensioning assembly 100. It should be appreciated that an operator may use one hand to manipulate the adjustment arm 230 and another hand to tighten and/or loosen the fastener assembly 229. In some embodiments, an alignment plate 320 is coupled to the spring 300 such that the alignment plate 320 pivots with the adjustment arm 410. In the desired position, a lower edge 322 of alignment plate 320 is optionally aligned with the platform 250. It should be appreciated in light of the foregoing that the angle of alignment plate 320 may serve as a visual indicator (e.g., to an operator, maintenance personnel, etc.) of the tension in belt 44.

Figure 7:
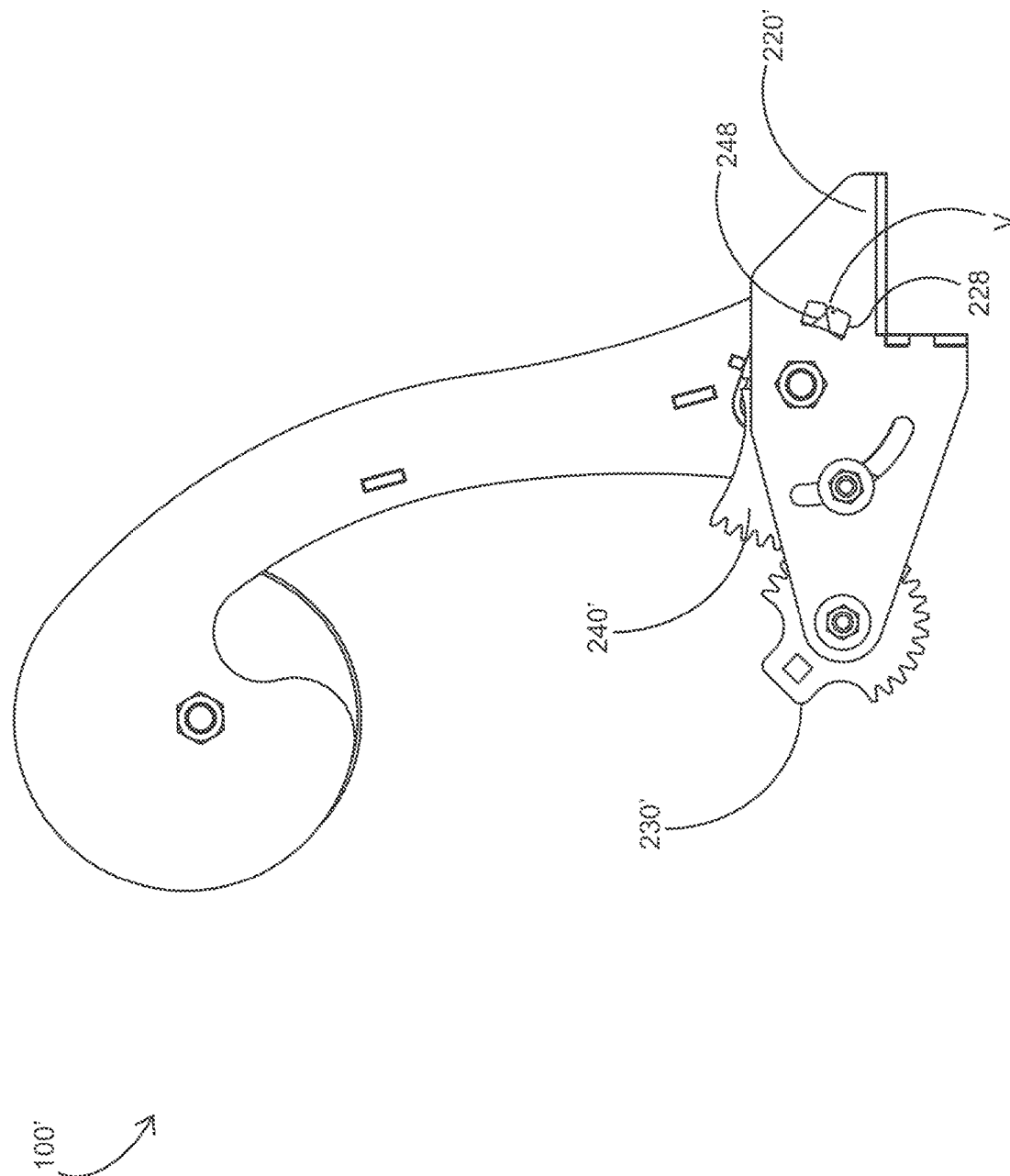
FIG. 7 is a side elevation view of another embodiment of a tensioner assembly.

Referring to FIG. 7, another embodiment of a tensioning assembly 100' is illustrated in which a visual indication of the tension in belt 44 is indicated by an indicator 248 on adjustment plate 240'. The indicator 248 is optionally visible on the view of FIG. 7 (e.g., from a position adjacent to the assembly) through an opening 228 provided in side plate 220. A visual indicator V is optionally provided at or adjacent to opening 228 for visual alignment of the indicator 248.

In various embodiments, the tensioning assembly 100 may be operably coupled to other types of vibratory classifiers (e.g., incline screens, vibratory feeders, etc.).

Ranges recited herein are intended to inclusively recite all values and sub-ranges within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A vibratory screen comprising first and second sidewalls and at least a first classifying deck supported between the sidewalls, and an eccentric shaft operably coupled to the sidewalls in order to vibrate the sidewalls and the first classifying deck, the vibratory screen comprising:
a motor;
a belt driven by said motor, said belt operably coupled to the eccentric shaft;
a belt tensioning assembly configured to adjust a tension in said belt, the tensioning assembly comprising:
a support bracket;
a belt engagement assembly operably engaging said belt;
a torsion spring, said torsion spring operably coupling said belt engagement assembly to said support bracket, said torsion spring mounted to a spring support;
an adjustment arm operably coupled to said support bracket and said spring support, a position of said adjustment arm being adjustable by a user, wherein adjustment of said position of said adjustment arm adjusts a tension in said torsion spring; and
a fastener removably coupling said adjustment arm, wherein tightening of said fastener secures said position of said adjustment arm.

2. The vibratory screen of claim 1, wherein said adjustment further comprising a visual indicator, said visual indicator indicating said tension in said torsion spring.

3. The vibratory screen of claim 2, wherein said visual indicator comprises said spring support, said spring support being aligned with a portion of said support bracket at a desired tension.

4. The vibratory screen of claim 2, wherein said visual indicator comprises a feature of an adjustment plate, said adjustment plate being operably coupled to said adjustment arm.

5. The vibratory screen of claim 1, wherein said support bracket is mounted to a motor mount of the screen.

6. The vibratory screen of claim 1, wherein said belt tensioning assembly further comprises:
an adjustment plate, said adjustment plate operably engaging said adjustment arm, said adjustment plate coupled to said spring support.

7. The vibratory screen of claim 1, wherein said belt engagement assembly comprises:
an arm coupled to said torsion spring; and
a pulley rollingly supported on said arm, said pulley rollingly engaging said belt.

8. The vibratory screen of claim 2, wherein said belt engagement assembly comprises:
an arm coupled to said torsion spring; and
a pulley rollingly supported on said arm, said pulley rollingly engaging said belt.

9. The vibratory screen of claim 5, wherein said belt engagement assembly comprises:
an arm coupled to said torsion spring; and
a pulley rollingly supported on said arm, said pulley rollingly engaging said belt.

10. The vibratory screen of claim 1, wherein said motor comprises an electric motor, and wherein said belt comprises a v-belt.

11. A tensioning assembly for use with a vibratory screen comprising first and second sidewalls and at least a first classifying deck supported between the sidewalls, and an eccentric shaft operably coupled to the sidewalls in order to vibrate the sidewalls and the first classifying deck, a motor, a belt driven by the motor and operably coupled to the eccentric shaft, wherein the tensioning assembly is adapted to adjust a tension in the belt, the tensioning assembly comprising:
a support bracket;
a belt engagement assembly configured to operably engage the belt;
a torsion spring, said torsion spring operably coupling said belt engagement assembly to said support bracket, said torsion spring mounted to a spring support;
an adjustment arm operably coupled to said support bracket and said spring support, a position of said adjustment arm being adjustable by a user, wherein adjustment of said position of said adjustment arm adjusts a tension in said torsion spring; and
a fastener removably coupling said adjustment arm, wherein tightening of said fastener secures said position of said adjustment arm.

12. The vibratory screen of claim 11, wherein said adjustment further comprising a visual indicator, said visual indicator indicating said tension in said torsion spring.

13. The vibratory screen of claim 12, wherein said visual indicator comprises said spring support, said spring support being aligned with a portion of said support bracket at a desired tension.

14. The vibratory screen of claim 12, wherein said visual indicator comprises a feature of an adjustment plate, said adjustment plate being operably coupled to said adjustment arm.

15. The vibratory screen of claim 11, wherein said support bracket is mounted to a motor mount of the screen.

16. The vibratory screen of claim 11, wherein said belt tensioning assembly further comprises:
an adjustment plate, said adjustment plate operably engaging said adjustment arm, said adjustment plate coupled to said spring support.

17. The vibratory screen of claim 11, wherein said belt engagement assembly comprises:
   an arm coupled to said torsion spring; and
   a pulley rollingly supported on said arm, said pulley rollingly engaging said belt.

18. The vibratory screen of claim 12, wherein said belt engagement assembly comprises:
   an arm coupled to said torsion spring; and
   a pulley rollingly supported on said arm, said pulley rollingly engaging said belt.

19. The vibratory screen of claim 15, wherein said belt engagement assembly comprises:
   an arm coupled to said torsion spring; and
   a pulley rollingly supported on said arm, said pulley rollingly engaging said belt.

* * * * *